US00RE41196E

(19) United States
(12) Reissued Patent
Selby

(10) Patent Number: US RE41,196 E
(45) Date of Reissued Patent: Apr. 6, 2010

(54) METHOD AND APPARATUS FOR DETECTING MOTION BETWEEN ODD AND EVEN VIDEO FIELDS

(75) Inventor: Steve Selby, Scarborough (CA)

(73) Assignee: Genesis Microchip Inc., Santa Clara, CA (US)

(21) Appl. No.: 11/250,140

(22) Filed: Oct. 12, 2005

Related U.S. Patent Documents

Reissue of:
(64) Patent No.: 6,633,612
Issued: Oct. 14, 2003
Appl. No.: 09/734,745
Filed: Dec. 13, 2000

(51) Int. Cl.
*H04N 7/12* (2006.01)

(52) U.S. Cl. ..... 375/240.16; 348/426.1; 348/431.1; 348/700; 348/E5.065; 348/E5.066

(58) Field of Classification Search ..... 375/240.16, 375/240.26, 240.13, 240.15, 240.17; 348/699–700, 348/425.1, 425.3, 426.1, 431.1, 446, 451–452; 382/232, 233, 236; *H04N 7/12; H04B 1/66*
See application file for complete search history.

(56) References Cited

U.S. PATENT DOCUMENTS

| | | | | |
|---|---|---|---|---|
| 4,982,280 A | | 1/1991 | Lyon et al. | |
| 4,998,287 A | | 3/1991 | Katznelson et al. | |
| 5,274,442 A | * | 12/1993 | Murakami et al. | 375/240.2 |
| 5,291,280 A | | 3/1994 | Faroudja et al. | |
| 5,317,398 A | | 5/1994 | Casavant et al. | |
| 5,394,196 A | | 2/1995 | Robert | |
| 5,398,071 A | | 3/1995 | Gove et al. | |
| 5,521,644 A | | 5/1996 | Sezan et al. | |
| 5,563,651 A | | 10/1996 | Christopher et al. | |
| 5,594,813 A | * | 1/1997 | Fandrianto et al. | 382/236 |
| 5,689,301 A | | 11/1997 | Christopher et al. | |
| 5,818,968 A | * | 10/1998 | Yoshimoto | 382/236 |
| 5,901,248 A | * | 5/1999 | Fandrianto et al. | 382/236 |
| 6,014,182 A | | 1/2000 | Swartz | |
| 6,130,723 A | | 10/2000 | Medin | |
| 6,157,412 A | | 12/2000 | Westerman et al. | |
| 6,340,990 B1 | * | 1/2002 | Wilson | 348/448 |
| 6,421,698 B1 | * | 7/2002 | Hong | 708/490 |
| 6,473,460 B1 | * | 10/2002 | Topper | 375/240.16 |
| 6,519,005 B2 | * | 2/2003 | Bakhmutsky et al. | 348/415.1 |
| 6,545,719 B1 | | 4/2003 | Topper | |
| 6,563,550 B1 | | 5/2003 | Kahn et al. | |
| 2002/0149703 A1 | | 10/2002 | Adams et al. | |
| 2003/0052996 A1 | | 3/2003 | Thompson et al. | |

FOREIGN PATENT DOCUMENTS

EP 0690617 1/1996

OTHER PUBLICATIONS

Delogne et al., "Conversion from interlaced to progressive formats by means of motion compensation based techniques", IEEE International Conference on Image Processing and its Applications, pp. 409–412, Apr. 1992.
Sugiyama et al., "A method of de–interlacing with motion compensated interpolation", IEEE Transactions on Consumer Electronics, vol. 45, Iss. 3, pp. 611–616, Aug. 1999.

* cited by examiner

*Primary Examiner*—Tung Vo
(74) *Attorney, Agent, or Firm*—Beyer Law Group LLP; Lisa K. Jorgenson

(57) ABSTRACT

A method for measuring motion at a horizontal and vertical position between video fields of opposite parity comprising the steps of measuring the signal values of at least two vertically adjacent pixels from a video field of one parity and at least two vertically adjacent pixels from a video field of the opposite parity such that when taken together, the pixels represent contiguous samples of an image at said horizontal and vertical position, and determining whether the signal value of any of the pixels lies between the signal values of adjacent pixels in the field of opposite parity and in response outputting a zero motion value, otherwise, outputting a motion value equal to the lowest absolute difference between any of the pixels and its closest adjacent pixel in the field of opposite parity.

12 Claims, 13 Drawing Sheets

$$\text{MOTION} = \begin{cases} 0, & \text{if } P1 <= P2 <= P3 \\ 0, & \text{if } P1 >= P2 >= P3 \\ 0, & \text{if } P2 <= P3 <= P4 \\ 0, & \text{if } P2 >= P3 >= P4 \\ \text{MIN}\{\,|P1 - P2|, |P2 - P3|, |P3 - P4|\,\}, & \text{otherwise} \end{cases}$$

$$= 0$$

$$\text{MOTION} = \begin{cases} 0, & \text{if } P1 <= P2 <= P3 \\ 0, & \text{if } P1 >= P2 >= P3 \\ 0, & \text{if } P2 <= P3 <= P4 \\ 0, & \text{if } P2 >= P3 >= P4 \\ \text{MIN}\{\,|P1 - P2|, |P2 - P3|, |P3 - P4|\,\}, & \text{otherwise} \end{cases}$$

$$= B$$

$$
\text{MOTION} = \begin{cases}
0, & \text{if } P1 <= P2 <= P3 \\
0, & \text{if } P1 >= P2 >= P3 \\
0, & \text{if } P2 <= P3 <= P4 \\
0, & \text{if } P2 >= P3 >= P4 \\
 & \ldots \\
0, & \text{if } P(n-2) <= P(n-1) <= P(n) \\
0, & \text{if } P(n-2) >= P(n-1) >= P(n) \\
\text{MIN}\{\,|P1 - P2|, |P2 - P3|, |P3 - P4| \ldots |P(n-1) - P(n)|\,\}, & \text{otherwise}
\end{cases}
$$

$$
\text{MOTION} = \begin{cases} 0, & \text{if } P1 <= P2 <= P3 \\ 0, & \text{if } P1 >= P2 >= P3 \\ 0, & \text{if } P2 <= P3 <= P4 \\ 0, & \text{if } P2 >= P3 >= P4 \\ \text{MIN}\{\,|P1 - P2|, |P2 - P3|, |P3 - P4|\,\}, & \text{otherwise} \end{cases}
$$

$$= C$$

$$\text{MOTION} = \begin{cases} 0, & \text{if } P1 <= P2 <= P3 \\ 0, & \text{if } P1 >= P2 >= P3 \\ 0, & \text{if } P2 <= P3 <= P4 \\ 0, & \text{if } P2 >= P3 >= P4 \\ \text{MIN}\{\,|P1 - P2|, |P2 - P3|, |P3 - P4|\,\}, & \text{otherwise} \end{cases}$$

$= 0$

METHOD AND APPARATUS FOR DETECTING MOTION BETWEEN ODD AND EVEN VIDEO FIELDS

Matter enclosed in heavy brackets [ ] appears in the original patent but forms no part of this reissue specification; matter printed in italics indicates the additions made by reissue.

FIELD OF THE INVENTION

This invention relates in general to digital video signal processing and more particularly to a method and apparatus whereby motion between odd and even video fields may be reliably measured despite the presence of high vertical spatial frequencies.

BACKGROUND OF THE INVENTION

The NTSC and PAL video standards are in widespread use throughout the world today. Both of these standards make use of interlacing in order to maximize the vertical refresh rate thereby reducing wide area flicker, while minimizing the bandwidth required for transmission. With an interlaced video format, half of the lines that make up a picture are displayed during one vertical period (i.e. the even field), while the other half are displayed during the next vertical period (i.e. the odd field) and are positioned halfway between the lines displayed during the first period. While this technique has the benefits described above, the use of interlacing can also lead to the appearance of artifacts such as line flicker and visible line structure.

It is well known in the prior art that the appearance of an interlaced image can be improved by converting it to non-interlaced (progressive) format and displaying it as such. Moreover, many newer display technologies, for example Liquid Crystal Displays (LCDs), are non-interlaced by nature, therefore conversion from interlaced to progressive format is necessary before an image can be displayed at all.

Numerous methods have been proposed for converting an interlaced video signal to progressive format. For example, linear methods have been used, where pixels in the progressive output image are generated as a linear combination of spatially and/or temporally neighbouring pixels from the interlaced input sequence.

Although this approach may produce acceptable results under certain conditions, the performance generally represents a trade off between vertical spatial resolution and motion artifacts. Instead of accepting a compromise, it is possible to optimize performance by employing a method that is capable of adapting to the type of source material. For instance, it is well known that conversion from interlaced to progressive format can be accomplished with high quality for sources that originate from motion picture film or from computer graphics (CG). Such sources are inherently progressive in nature, but are transmitted in interlaced format in accordance with existing video standards. For example, motion picture film created at 24 frames per second is converted to interlaced video at 60 fields per second using a process known as 3:2 pull down, where 3 fields are derived from one frame and 2 are derived from the next, so as to provide the correct conversion ratio. Similarly, a computer graphics sequence created at 30 frames per second is converted to interlaced video at 60 fields per second using a pull down ratio of 2:2, where 2 fields are derived from each CG frame. By recognizing that a video sequence originates from a progressive source, it is possible for a format converter to reconstruct the sequence in progressive format exactly as it was before its conversion to interlaced format.

Unfortunately, video transmission formats do not include explicit information about the type of source material being carried, such as whether the material was derived from a progressive source. Thus, in order for a video-processing device to exploit the progressive nature of film or CG sources, it is first necessary to determine whether the material originates from a progressive source. If it is determined that the material originates from such a source, it is furthermore necessary to determine precisely which video fields originate from which source frames. Such determination can be made by measuring the motion between successive fields of an input video sequence.

It is common to measure at least two different modes of motion in determining the presence of a film source. Firstly, it is common to measure the motion between a given video field and that which preceded it by two fields. In this case, motion can be measured as the absolute difference between two pixels at the same spatial position in the two fields. A measure of the total difference between the two fields can be generated by summing the absolute differences at the pixel level over the entire field. The quality of the motion signal developed in this way will be fairly high, since the two fields being compared have the same parity (both odd or both even) and therefore corresponding samples from each field have the same position within the image. Thus any difference that is measured between two pixels will largely be the result of motion. Although the quality of measurement made in this way is high, unfortunately it is of limited value. For an input sequence derived from film in accordance with a 3:2 pull down ratio, only one out of five successive measurements made in this way will differ significantly from the rest. The measure of motion between the first and third fields of the three fields that are derived from the same motion picture frame will be substantially lower than the measurements obtained during the other four fields, since the two fields being compared are essentially the same and differ only in their noise content. This does not provide sufficient information to avoid artifacts under certain conditions when a film sequence is interrupted. Also, in the case of an input sequence derived from film or CG in accordance with a 2:2 pull down ratio, no useful information is provided whatsoever.

A second mode of motion that can be measured is the motion between successive fields which are of opposite parity (one odd and one even). Although this mode of measurement overcomes the limitations of the above, it is inherently a more difficult measurement to make since a spatial offset exists between fields that are of opposite parity. Thus, even if there is no actual motion, a finite difference between the fields may exist owing to the spatial offset. This tends to increase the measured difference when there is no motion making it more difficult to reliably discriminate between when there is motion and when there is not. This is particularly true in the presence of noise and/or limited motion. A number of methods have been proposed in the prior art for the measurement of motion between fields of opposite parity. It is an objective of the present invention to provide a method for the measurement of motion between fields of opposite parity with greater ability to discriminate between the presence of motion or lack thereof than those of the prior art.

Various techniques besides those linear methods described above, have also been proposed for conversion from interlaced to progressive format of video material not derived from film. For example, if it can be determined whether specific parts of an image are in motion, then each part can be processed accordingly to achieve more optimal results. This requires the measurement of motion locally and is akin to the problem of measuring motion globally as required to determine the presence of film sources. The same elemental operations may be used to measure differences at a pixel level, only in the latter case the differences are summed over an entire field to produce a global measurement, whereas in the former case the difference may be used as a measure of local motion without further summation. As with the global case, the local case may involve various modes of measurement. One of the modes that can be used to advantage is the local measurement of motion between successive fields of opposite parity. It is a further objective of the present invention to provide such a method.

The following patents are relevant as prior art relative to the present invention:

| U.S. Pat. Documents | | |
|---|---|---|
| 5,689,301 - Christopher | Nov. 18, 1997 | Method and apparatus for identifying video fields produced by film sources |
| 6,014,182 - Swartz | Jan. 11, 2000 | Film source video detection |
| 4,932,280 - Lyon | Jan. 1, 1991 | Motion sequence pattern detector for video |
| 5,291,280 - Faroudja | Mar. 1, 1994 | Motion detection between even and odd fields within 2:1 interlaced television standard |

SUMMARY OF THE INVENTION

According to the present invention, a method and apparatus are provided whereby the motion between two fields of opposite parity may be measured with greater ability to discriminate between the presence of motion and lack thereof than with those techniques of the prior art. According to the present invention, the level of motion between the two fields at a specific position is determined by comparing the values of four vertically adjacent pixels, each of which having the same horizontal position, where the first and third pixels are taken from vertically adjacent lines in one field, the second and fourth pixels are taken from vertically adjacent lines in the other field such that the vertical position of the second pixel is halfway between the first and third pixels and the vertical position of the third pixel is halfway between the second and fourth pixels. If the value of the second pixel lies between the values of the first and third pixels, of if the value of the third pixel lies between the values of the second and fourth pixels, then the local motion is taken as zero. Otherwise, the local motion is taken as the minimum of the absolute differences between the first and second pixels, the second and third pixels, and between the third and fourth pixels.

This technique has the benefit that false detection of motion arising from the presence of high vertical spatial frequencies is minimized, while actual motion is still readily detected. Using this technique, false detection is completely avoided for vertical spatial frequencies less than one half of the vertical frame Nyquist frequency. Utilizing more than four pixels extends the range of vertical spatial frequencies for which false detection is completely avoided irrespective of the vertical frame Nyquist frequency. In general, if the method of the present invention is scaled to utilize n pixels where n is greater than or equal to four, then false detection of motion is avoided for frequencies up to and including $(n-3)/(n-2)$ of the vertical frame Nyquist frequency. In any case, the resulting local measurement of motion can either be used directly or summed over an entire field in order to provide a global motion signal that is useful for determining whether an input sequence derives from a film source.

According to a further aspect of the present invention, the contributing pixels are chosen such that their spatial positions remain constant regardless of whether the most recent of the two fields is even or odd. In this way, any motion that is falsely detected in a static image remains constant from one field to the next, thereby improving the ability to distinguish between falsely detected motion and actual motion that arises as a result of a sequence that was generated in accordance with a 2:2 pull down ratio.

BRIEF DESCRIPTION OF THE DRAWINGS

A description of the prior art and of the preferred embodiments of the present invention is provided hereinbelow with reference to the following drawings in which.

DESCRIPTION OF THE PREFERRED EMBODIMENTS

Figure 1:
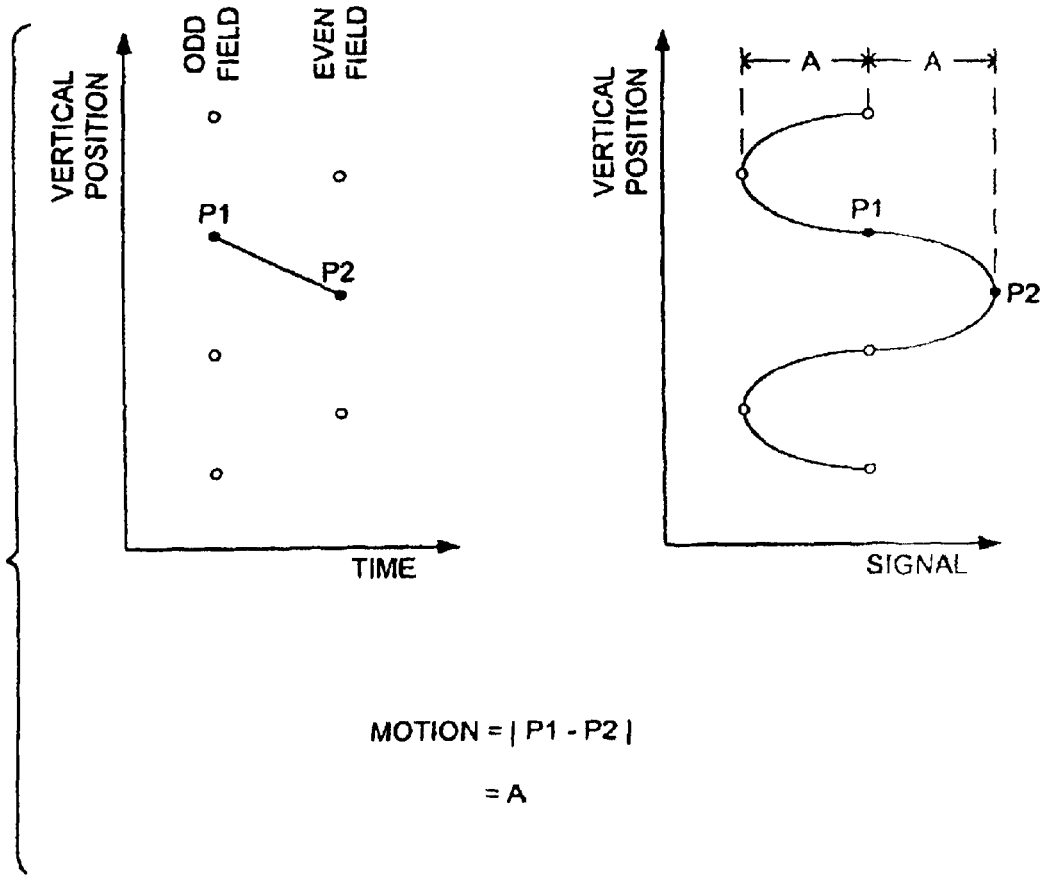
FIG.1 (PRIOR ART)
FIG. 1 is a schematic representation showing how motion may be measured between successive fields of opposite parity, according to the prior art.

Referring now to FIG. 1, a first example is shown of how motion may be measured between successive fields of opposite parity, according to one technique known in the prior art. The left half of FIG. 1 shows the spatio-temporal relationship between a set of vertically and temporally adjacent pixels at a given horizontal position. It is clearly shown in FIG. 1 that the vertical position of each pixel in the even field is halfway between the two nearest pixels in the odd field. The right half of FIG. 1 shows the value of each pixel relative to its vertical position. A curved line is shown connecting the pixels and is intended to represent an image detail, the intensity of which varies vertically within the image in a sinusoidal fashion with the bright and dark image portions (i.e. signal crests and troughs) occurring in the even video field, and intermediate intensity image portions occurring in the odd field. The curved line is drawn continuously through the pixels of both the odd and the even fields to represent the fact that both fields are part of an image in which there is no motion. Two pixels, P1 and P2 are highlighted showing their spatio-temporal relationship to one another and their values within the image. In this example, the image detail has a vertical spatial frequency that is exactly equal to one half of the vertical frame Nyquist frequency and a peak amplitude equal to quantity A. The formula at the bottom of FIG. 1 shows how a local measurement of motion is made using a first prior art technique. The motion is simply taken as the absolute difference between the two pixels P1 and P2, as depicted in FIG. 1. Note that although the pixel values used in this example are intended to represent samples of an image in which there is no motion, application of this prior art technique will result in a measured motion value equal to quantity A. Thus, this technique fails to reject as motion the difference between pixels P1 and P2 that arises owing to their different vertical positions.

Figure 2:
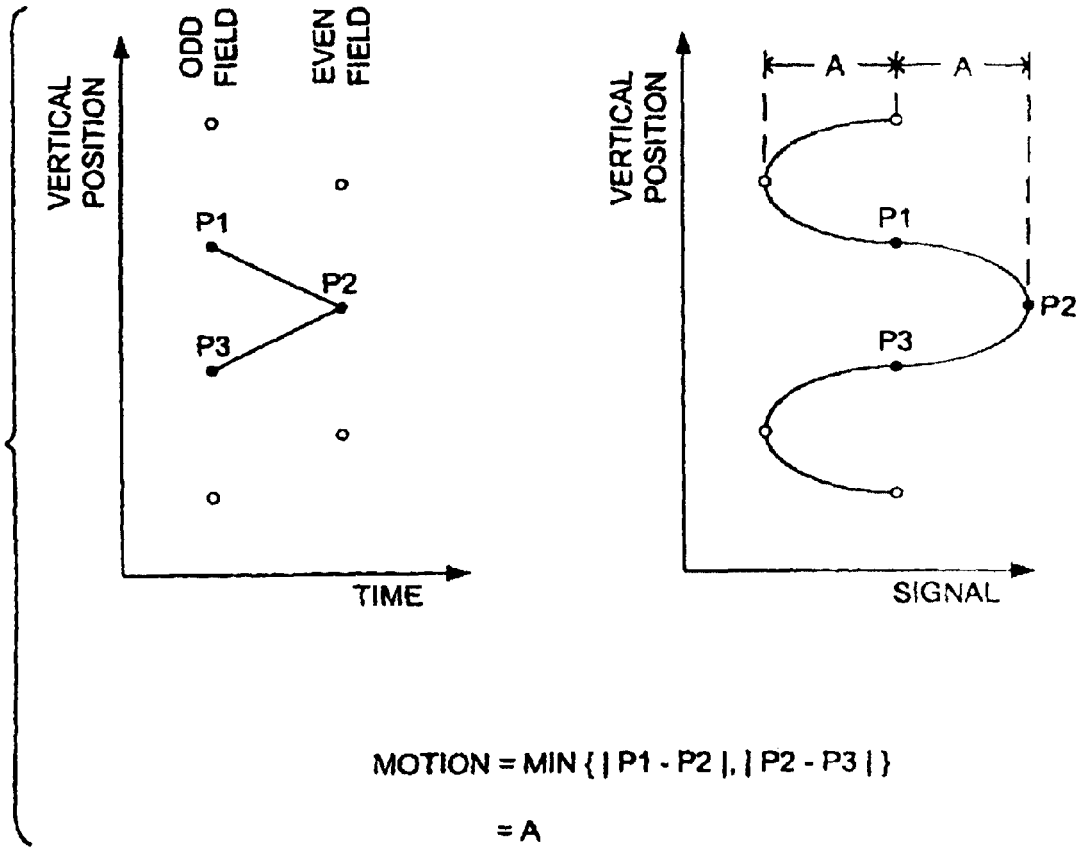
FIG.2 (PRIOR ART)
FIG. 2 is a schematic representation showing how motion may be measured between successive fields of opposite parity using a second method, according to the prior art.

Referring now to FIG. 2, a somewhat enhanced measurement technique is shown as fully disclosed in U.S. Pat. No. 5,291,280 (Faroudja). The left half of the figure shows the spatio-temporal relationship between pixels in two successive video fields while the right half shows the value of each pixel relative to its vertical position for a particular image detail. The example used is that of an image detail that has a vertical spatial frequency exactly equal to one half of the vertical frame Nyquist frequency. The formula for calculating the motion according to this second method is shown at the bottom of FIG. 2. The measured motion is taken as the lesser of the absolute differences between pixels P1 and P2, and between pixels P2 and P3, as depicted in FIG. 2. As before, although the pixel values used in this example are intended to represent samples of an image in which there is no motion, application of this technique will result in a measured motion value equal to quantity A. Thus, as with the previous method, this technique fails to reject as motion the difference between the pixels that arises owing to their different vertical positions.

Figure 3:
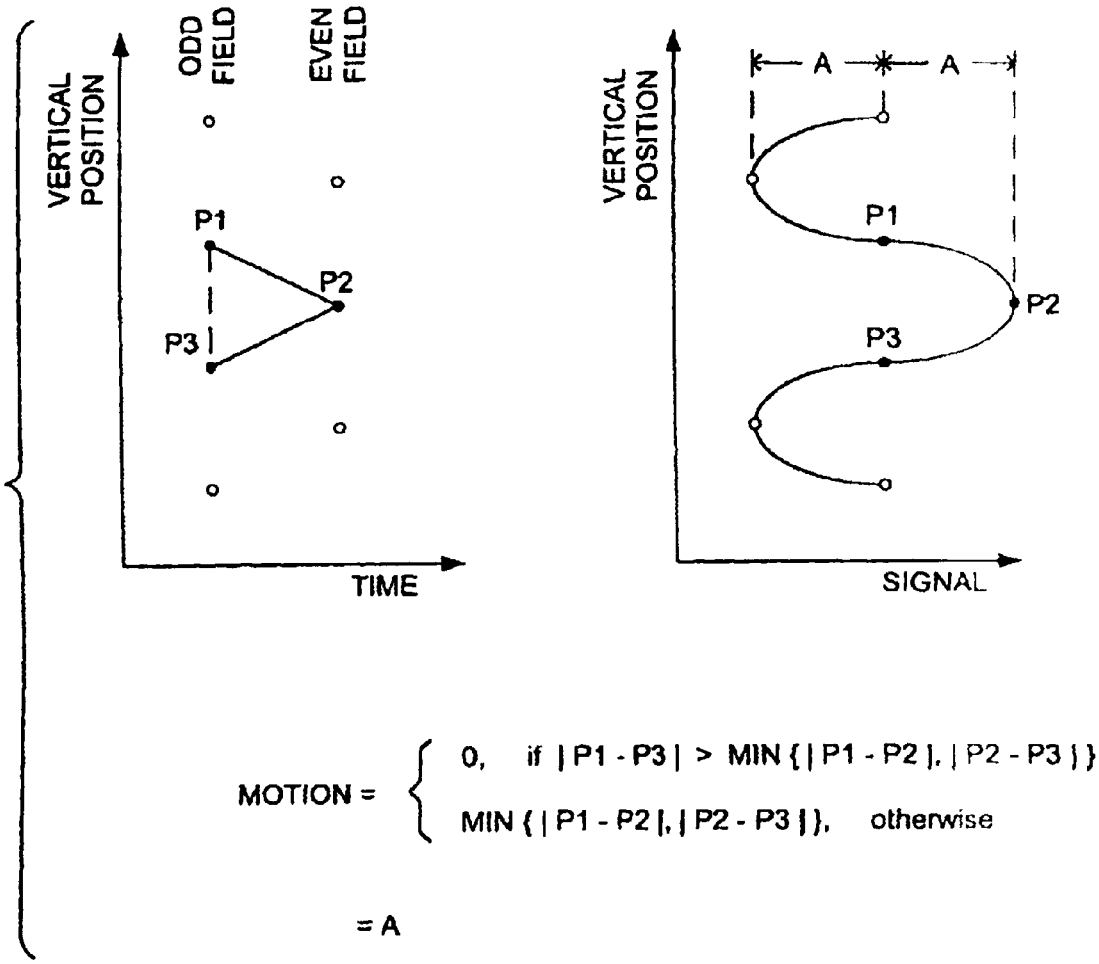
FIG.3 (PRIOR ART)
FIG. 3 is a schematic representation showing how motion may be measured between successive fields of opposite parity using a third method, according to the prior art.

Referring now to FIG. 3, a further enhanced measurement technique is shown, as disclosed in U.S. Pat. No. 6,014,182 (Swartz). The left half of the figure shows the spatio-temporal relationship between pixels in two successive video fields while the right half shows the value of each pixel relative to its vertical position for a particular image detail. The example used is that of an image detail that has a vertical spatial frequency exactly equal to one half of the vertical frame Nyquist frequency. The formula for calculating the motion according to this third method is shown at the bottom of FIG. 3. The measured motion is taken as the lesser of the absolute differences between pixels P1 and P2, and between pixels P2 and P3, unless the absolute difference between pixels P1 and P3 is greater than the lesser of the absolute differences between pixels P1 and P2, and between pixels P2 and P3, in which case the motion value is taken as zero. As before, although the pixel values used in this example are intended to represent samples of an image in which there is no motion, application of this technique results in a measured motion value equal to quantity A. Thus, as with the previous method, this technique fails to reject as motion the difference between the pixels that arises owing to their different vertical positions.

Figure 4:
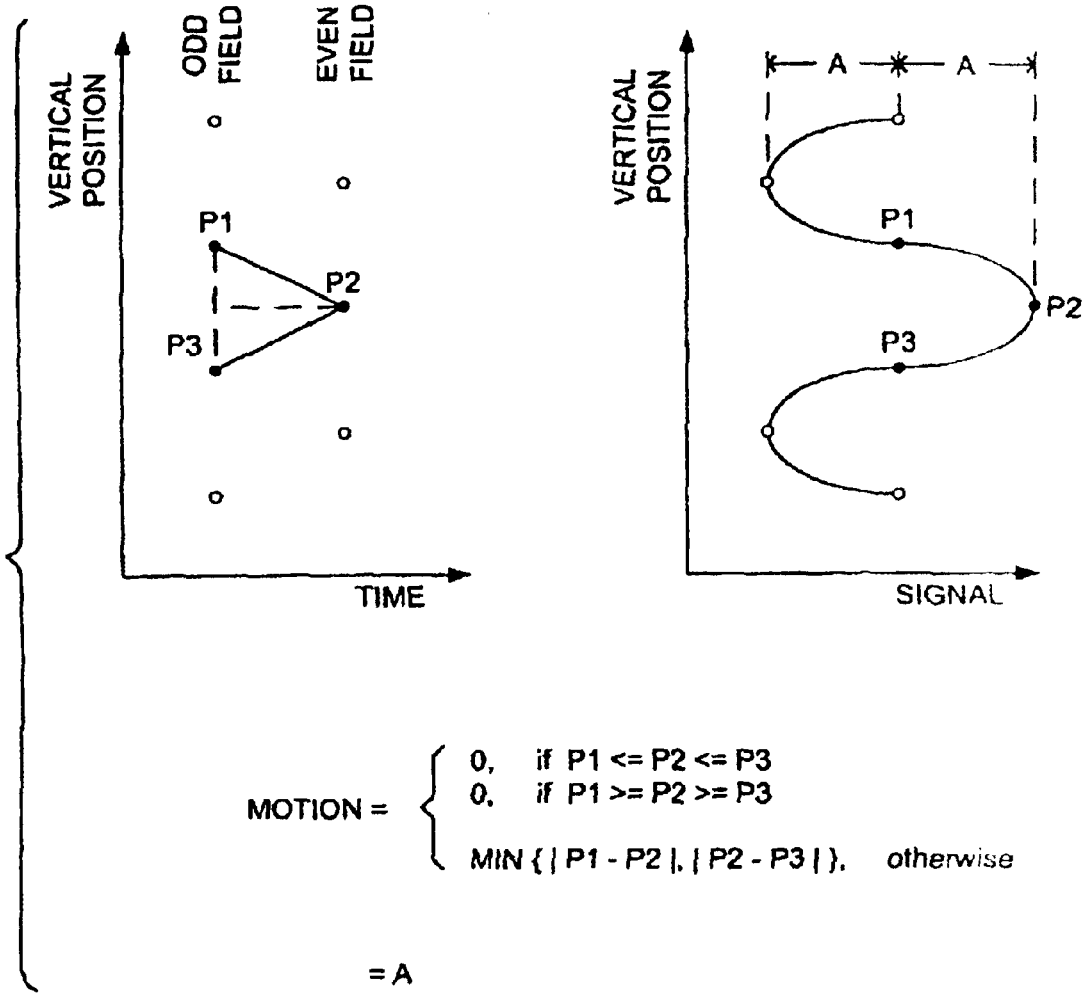
FIG.4 (PRIOR ART)
FIG. 4 is a schematic representation showing how motion may be measured between successive fields of opposite parity using a fourth method, according to the prior art.

Referring now to FIG. 4, another enhanced measurement technique is shown, as disclosed in U.S. Pat. No. 5,689,301 (Christopher). The left half of the figure shows the spatio-temporal relationship between pixels in two successive video fields while the right half shows the value of each pixel relative to its vertical position for a particular image detail. The example used is that of an image detail that has a vertical spatial frequency exactly equal to one half of the vertical frame Nyquist frequency. The formula for calculating the motion according to this fourth method is shown at the bottom of FIG. 4. The measured motion is taken as the lesser of the absolute differences between pixels P1 and P2, and between pixels P2 and P3, unless the value of pixel P2 is between the values of pixels P1 and P3, in which case the motion value is taken as zero. As before, although the pixel values used in this example are intended to represent samples of an image in which there is no motion, application of this technique results in a measured motion value equal to quantity A. Thus, as with the previous method, this technique fails to reject as motion the difference between the pixels that arises owing to their different vertical positions.

Figure 5:
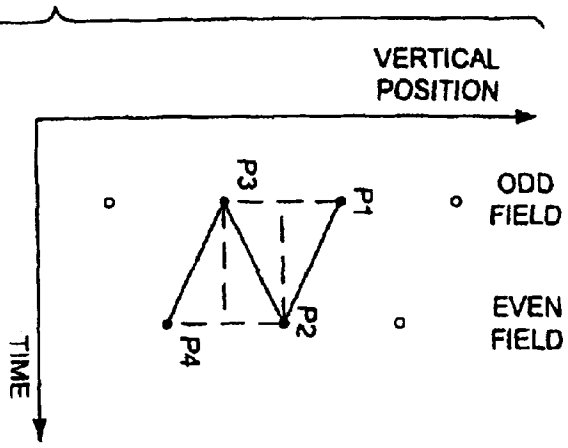
FIG. 5 is a schematic representation of a first example showing how motion may be measured between successive fields of opposite parity, according to the method of the present invention.
Figure 5:
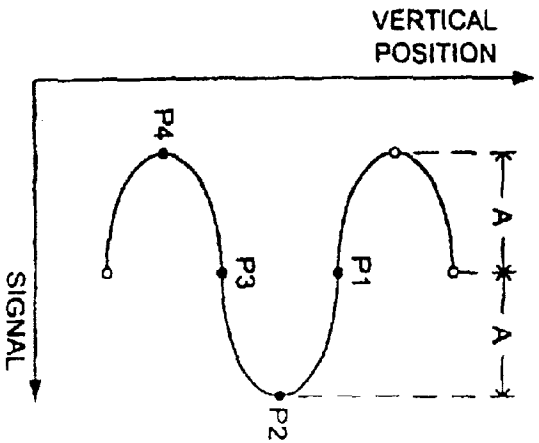

Referring now to FIG. 5, an enhanced measurement technique is shown according to the present invention. The left half of the figure shows the spatio-temporal relationship between pixels in two successive video fields while the right half shows the value of each pixel relative to its vertical position for a particular image detail. The example used is that of an image detail that has a vertical spatial frequency exactly equal to one half of the vertical frame Nyquist frequency. The formula for calculating the motion according to one aspect of the present invention is shown at the bottom of FIG. 5. The measured motion is taken as the lesser of the absolute differences between pixels P1 and P2, pixels P2 and P3, and between pixels P3 and P4, unless the value of either pixel P2 or pixel P3 is between the values of its immediate neighbours, in which case the motion value is taken as zero. Using this technique, the motion value generated in the example is zero, since the value of pixel P3 is between that of P2 and P4. This is the desired result, since the pixel values in the example are intended to represent samples of an image in which there is no motion. In fact, it can be shown that by using this technique, false detection of motion is completely avoided for vertical spatial frequencies less than one half of the vertical frame Nyquist frequency. Although some of the prior art techniques may avoid false motion under certain conditions, there is no vertical spatial frequency below which any of the four prior art techniques discussed above are guaranteed to avoid all false motion, as provided by the present invention.

Figure 6:
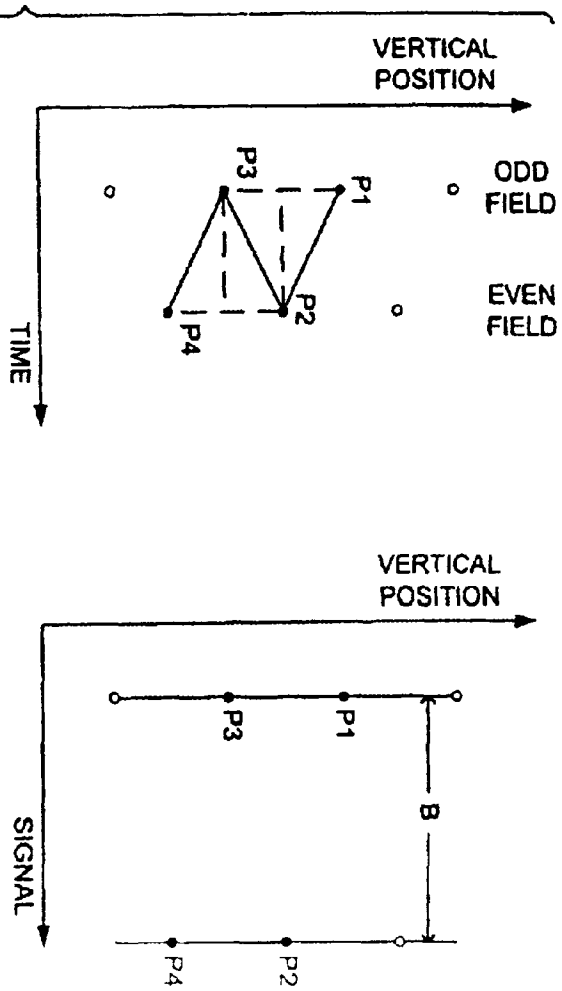
FIG. 6 is a schematic representation of a second example showing how motion may be measured between successive fields of opposite parity, according to the method of the present invention.

Referring now to FIG. 6, another example is provided in which the present invention is applied to an image in which motion exists. The left half of the figure shows the spatio-temporal relationship between pixels in two successive video fields while the right half shows the value of each pixel relative to its vertical position within the image. In this example, a continuous line has been drawn through pixels P1 and P3 from the odd field, and a separate line has been drawn through pixels P2 and P4 from the even field to represent the fact there is no direct correlation between the samples from the odd field and those from the even field. Pixel values P2 and P4 differ from pixel values P1 and P2 by quantity B. According to the method of the present invention, the motion value is given as quantity B which is the desired result since it correctly indicates the presence of motion between the fields. The use of a four-pixel aperture in the present invention may result in a lower measured motion value near the edges of moving objects than would otherwise be obtained using a two or three pixel aperture as in the prior art methods. When summed over an entire field, this may tend to produce a slightly lower total than would otherwise be obtained. However, the present technique produces significantly lower false motion values for fields between which there is no motion. For typical video sources, the present technique results in a significantly higher ratio between the values measured where motion exists and the values measured where there is none. Hence, the ability to discriminate between motion and lack thereof is enhanced.

Figure 7:
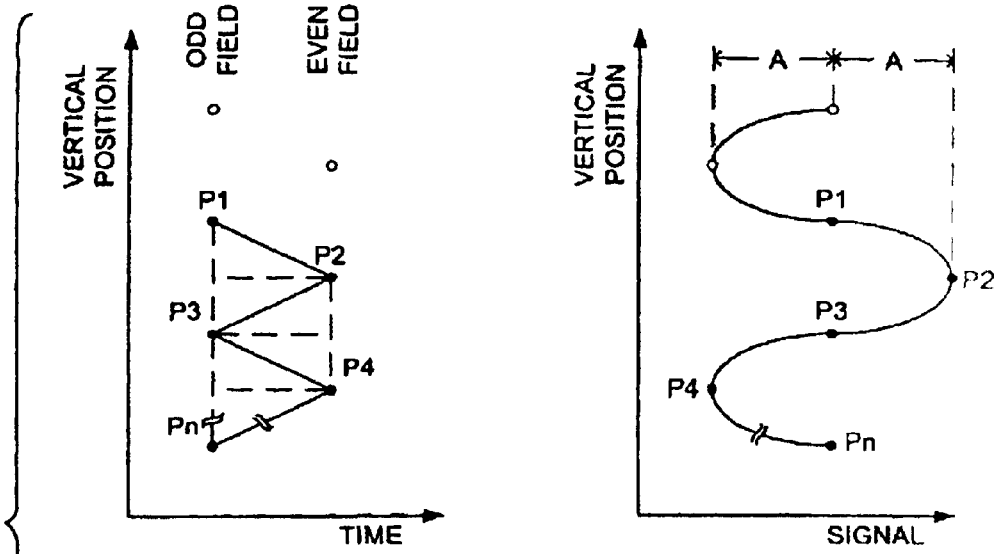
FIG. 7 is a schematic representation showing how motion may be measured between successive fields of opposite parity, according to an alternative embodiment of the method of the present invention.

In another aspect of the present invention, utilizing greater than four pixels extends the range of vertical spatial frequencies for which false detection is avoided. Referring now to FIG. 7, an example is provided which is similar to that of FIG. 5 except that the method has been generalized to make use of n pixels. The formula for calculating the motion is shown at the bottom of the figure. The example used is that of an image detail that has a vertical spatial frequency exactly equal to one half of the vertical frame Nyquist frequency. Application of the formula in this case yields a motion value of zero, which is the desired result since there is no motion between the fields. It will be understood from FIG. 7 that for higher frequencies as well, in particular those frequencies up to and including (n−3)/(n−2) of the vertical frame Nyquist frequency, false detection of motion is completely avoided.

Figure 8:
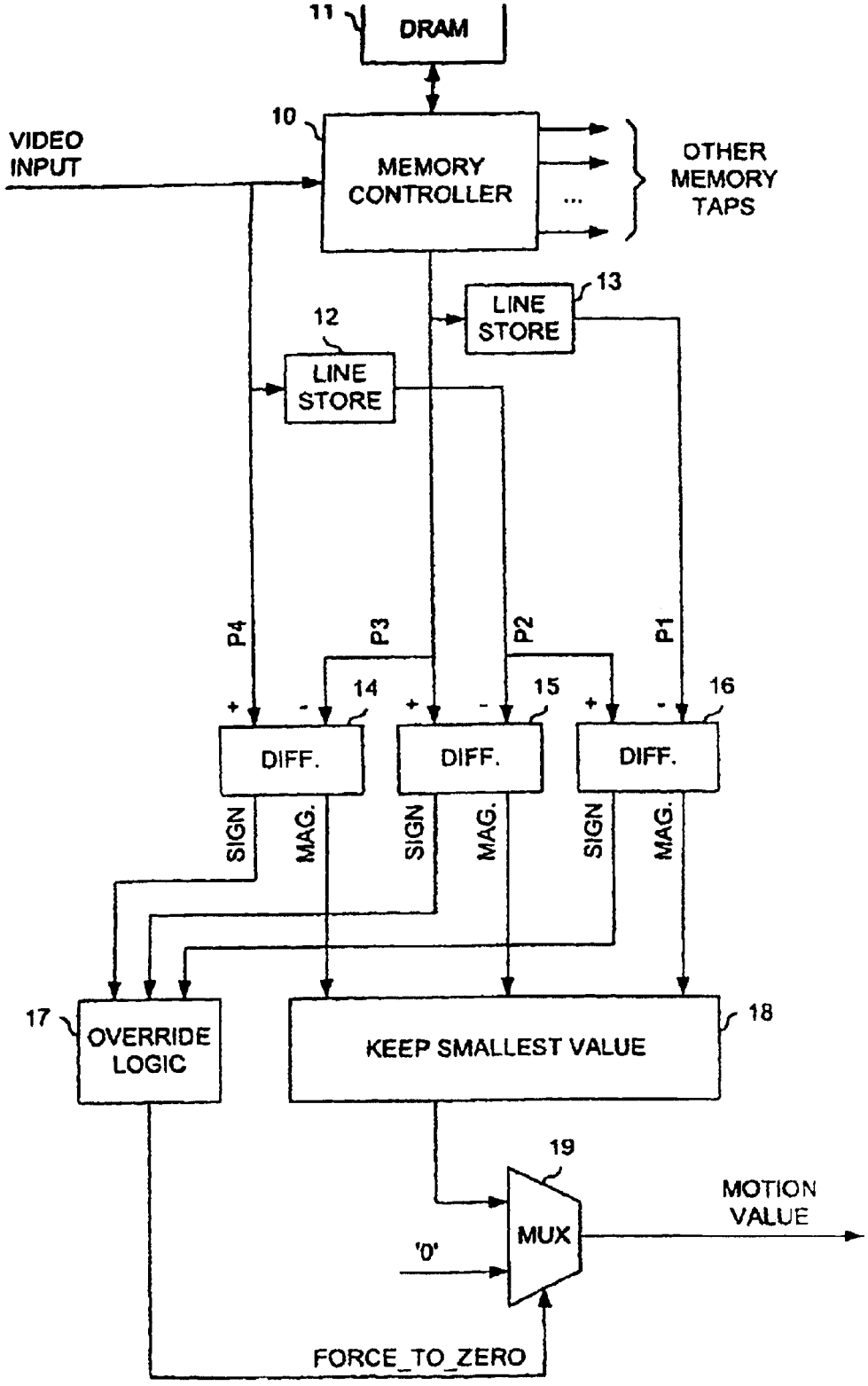
FIG. 8 is a block diagram of an apparatus for implementing the method of the present invention.

FIG. 8 shows an apparatus implementing the method of the present invention as shown in FIG. 5 where a motion value is calculated based on four pixels. An input video signal is applied to the input of a memory controller 10, a line delay element 12 and a first input of a differencing circuit 14. The pixel that is present at the video input at any given time corresponds to that designated as pixel P4 in FIG. 5. The memory controller stores incoming video data into a DRAM array 11 and later retrieves it so as to produce a version of the input video signal that is delayed (e.g. by 263 lines in the case of an NTSC input). The memory controller 10 may also concurrently retrieve other versions of the input video signal that are delayed by different amounts to be used for other purposes that are not relevant to the present invention. The pixel that is output from the memory controller 10 at any given time corresponds to that designated as pixel P3 in FIG. 5, which is subsequently applied to the input of a second line delay element 13, a first input of a differencing circuit 15 and the second input of differencing circuit 14 referred to herein above. Line delay element 12 provides a version of the input video signal that is delayed by one vertical line, and corresponds to pixel P2 in FIG. 5. Pixel P2 is applied to a first input of a differencing circuit 16 and the second input of differencing circuit 15 described earlier. Line delay element 13 provides a version of the delayed video signal from the memory controller that is further delayed by one vertical line and corresponds to pixel P1 in FIG. 5. Pixel P1 is applied to the second input of differencing circuit 16. Each of the differencing circuits 14–16 generates both the sign and the magnitude of the differences between their input signals. The three signals representing the signs of the differences are applied to the inputs of override logic block 17. The three signals representing the magnitudes of the differences are applied to the inputs of the keep smallest value block 18 which propagates only the smallest of the three values at its input. A multiplexor 19 selects either the output of the keep smallest value block or zero, depending on the output of override logic block 17. The value at the output of multiplexor 19 is forced to zero if the signs at the outputs of differencing circuits 14 and 15 are the same, of if the signs at the outputs of differencing circuits 15 and 16 are the same. The value at the output of multiplexor 19 provides a measure of the motion in the vicinity of pixels P1–P4 according to one aspect of the present invention. The local motion value may be integrated over a complete field in order to provide an overall measure of the motion between two fields for the purpose of determining whether the input sequence derives from a film source. Alternatively, the local motion value may be used to advantage without subsequent integration for the conversion from interlaced to progressive format of material that has not been derived from film.

Figure 9:
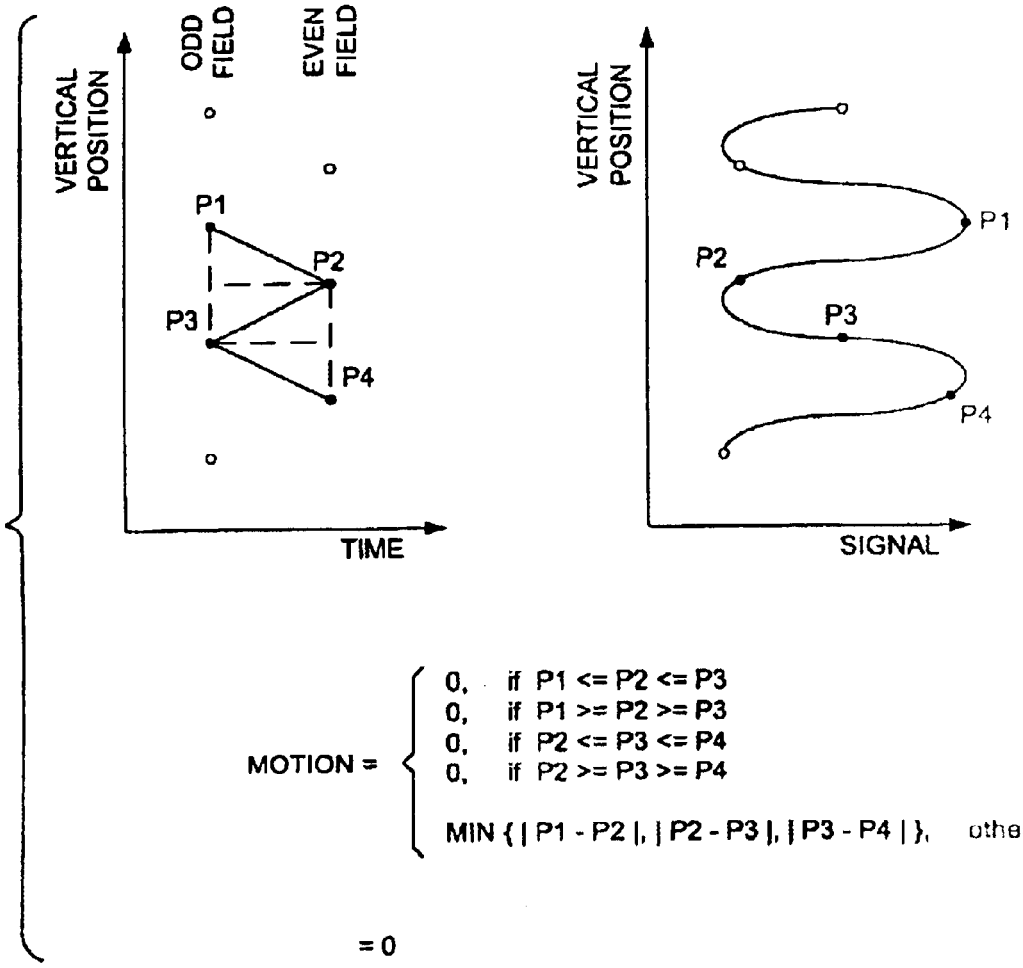
FIG. 9 is a schematic representation of a third example to show how motion may be measured between successive fields of opposite parity where the most recent of the two fields is even, according to the method of the present invention.

In order to fully determine the motion sequence, it is necessary to measure a new motion value for each and every field that is received. In half of the cases, the most recent of the two fields is even, while in the other half the most recent field is odd. In all of the prior art methods described above, the spatio-temporal relationship of the contributing pixels relative to one another is fixed irrespective of whether the most recent field is even or odd. In a further aspect of the present invention, the spatio-temporal relationship is chosen depending on whether the most recent field is even or odd, so as to generate a measure of the motion that does not change unduly from one field to the next. Referring now to FIG. 9, an example of the present invention is provided which is similar to that shown in FIG. 5, except the image detail includes a vertical frequency component that is greater than half the vertical frame Nyquist frequency. Note that in this example, the most recent of the two fields is even. Application of the method in this case results in a measured motion value of zero, since the value of P3 clearly lies between that of P2 and P4. It should be noted that the inventive method produces a value of zero even though in this case the image detail contains a frequency component outside of the range where false detection is guaranteed to be avoided. This is coincidental and may occur depending on the phase of the image signal with respect to the sample points.

Figure 10:
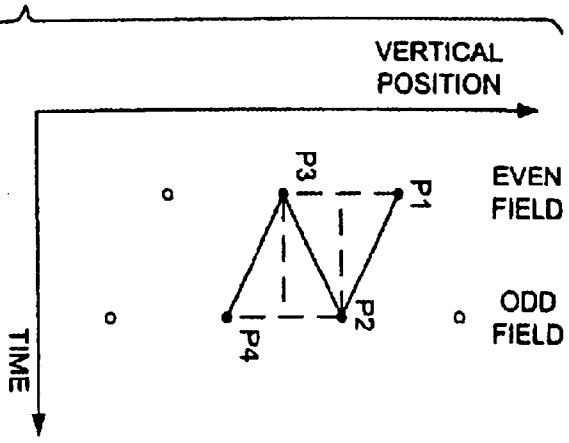
FIG. 10 is a schematic representation of a fourth example to show how motion may be measured between successive fields of opposite parity where the most recent of the two fields is odd, according to the method of the present invention.
Figure 10:
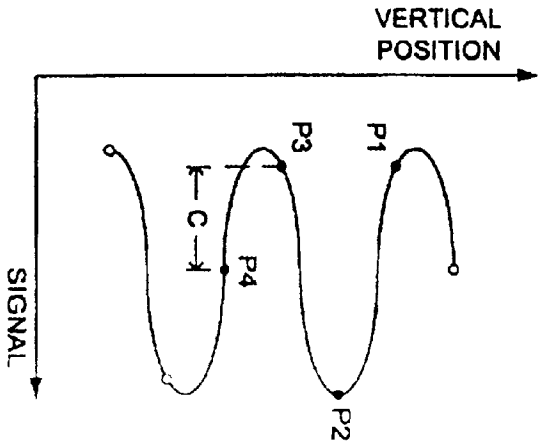
Figure 11:
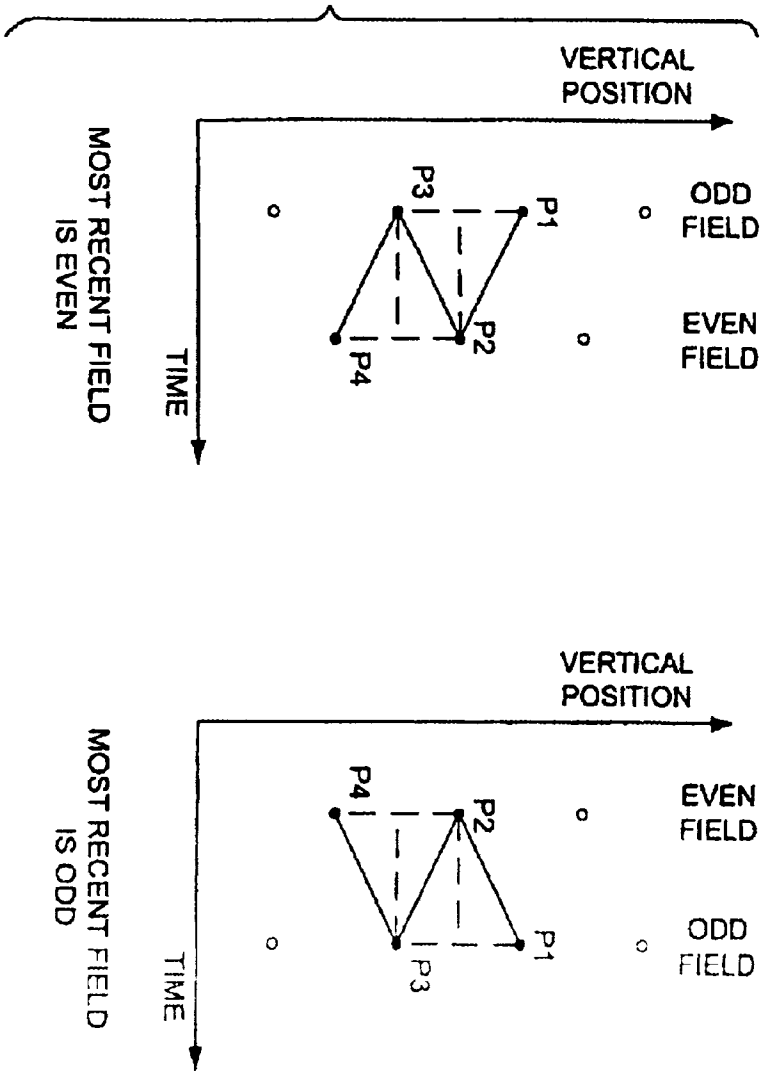
FIG. 11 is a schematic representation showing how the contributing pixels are selected to have a particular spatio-temporal relationship to one another depending on whether the most recent field is even or odd, according to a further aspect of the present invention.

Referring to FIG. 10, an example is set forth in which the method is applied to the same image detail set forth in FIG. 9 but where the most recent field is odd. In this example, the spatio-temporal relationship between pixels P1 to P4 has been maintained, as in the prior art methods described earlier. Due to the half line offset between the odd and even fields, the four contributing pixels have moved along the contour of the static image detail, relative to FIG. 9. Application of the method in this case results in a measured motion value equal to quantity C, since the value of P2 does not lie between that of P1 and P3, nor does the value of P3 lie between that of P2 and P4. Thus, it can be seen that the measured motion value may alternate from one field to the next depending on whether the most recent field is even or odd, despite the fact there may be no actual motion at all within the image. The inventor has realized that this is a detrimental result since alternating high and low motion values is exactly the same pattern that would be produced by an actual motion sequence produced in accordance with a 2:2 pull down ratio, thereby hampering the ability to distinguish motion from static images in accordance with the present invention. Consequently, the inventor has concluded that the spatio-temporal relationship between the contributing pixels should preferably be chosen depending on whether the most recent field is even or odd, as shown in FIG. 11. Essentially, the pixels are chosen such that for a static image, the same image samples are always used. Thus, if PI represents a sample from an odd field, then P1 is always taken from an odd field, regardless of whether the most recent field is odd or even.

Figure 12:
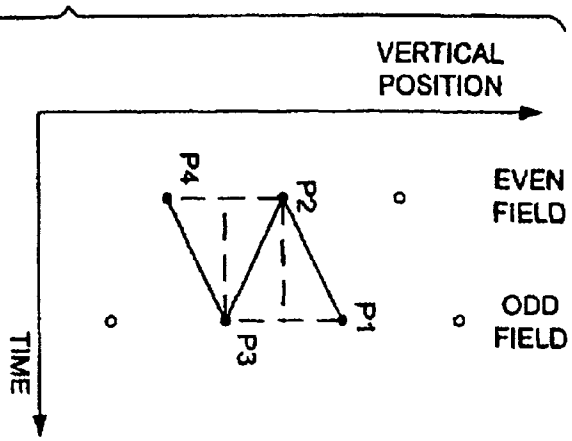
FIG. 12 is a schematic representation of a further example to show how motion may be measured between successive fields to opposite parity where the most recent of the two fields is odd, according to the method of the present invention.
Figure 12:
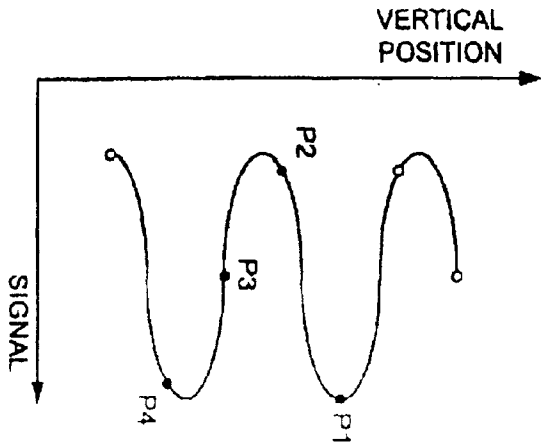

Referring now to FIG. 12, an example is provided of the preferred method for choosing the spatio-temporal relationship between the contributing pixels as applied to the example of FIGS. 9 and 10 for the case where the most recent field is odd. Application of the formula according to the method of the present invention yields a measured motion value of zero, which is the same result as in FIG. 9 where the most recent field is even. Thus, undue modulation of the motion value from field to field is effectively avoided. It should be noted that in the examples of FIGS. 9, 11 and 12, pixel P1 has consistently been taken from the odd field. It will be apparent to one of ordinary skill in the art that pixel P1 could have consistently been taken from the even field instead, with results equal in overall performance.

Figure 13:
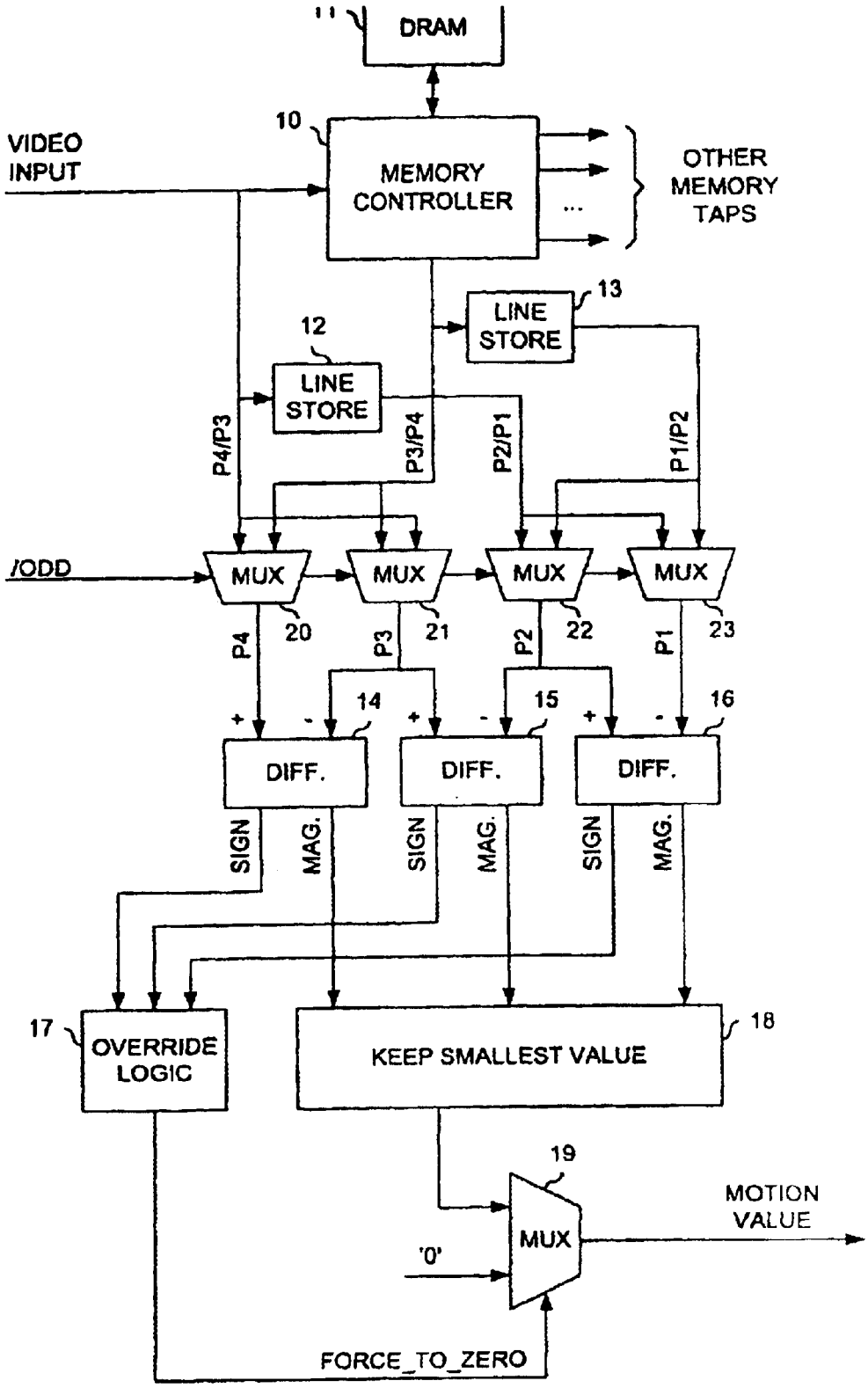
FIG. 13 is a block diagram of an apparatus for implementing the method as set forth in FIGS. 9, 11 and 12, according to a preferred embodiment of the present invention.

FIG. 13 shows an apparatus for implementing the method of the present invention as shown in FIGS. 9, 11 and 12. For convenience, the same numbers have been used to designate those items that are in common with the apparatus shown in FIG. 8. The refinement of appropriately selecting the pixels so as to avoid modulation of the motion signal from one field to the next is achieved by the addition of four multiplexors 20–23 and through manipulation of the delay provided by the memory controller 10. It will be apparent from inspection of FIGS. 10 and 12 that the less desirable spatio-temporal relationship between the contributing pixels for the case in which the most recent field is odd as shown in FIG. 10, can be transformed to the more desirable case as show in FIG. 12, by delaying the even field by one less line and by subsequently interchanging pixel P1 with P2 and pixel P3 with P4. In the apparatus of FIG. 13, multiplexors 20 and 21 are used to interchange pixels P3 and P4, while multiplexors 22 and 23 are used to interchange pixels P1 and P2, for the case when the field that is currently being inputted is odd.

A person understanding the present invention may conceive of other embodiments and variations thereof without departing from the sphere and scope of the invention as defined by the claims appended hereto.

I claim:

1. A method for measuring motion at a horizontal and vertical position between video fields of opposite parity *of a video signal* comprising the steps of:

measuring the *video* signal values of at least two vertically adjacent pixels from a video field of one parity and at least two vertically adjacent pixels from a video field of the opposite parity such that when taken together, the pixels represent contiguous samples of an image at said horizontal and vertical position; [and]

determining, *using differencing circuitry,* whether the signal value of any of said pixels lies between the signal values of adjacent pixels in the field of opposite parity and in response outputting a zero motion value, otherwise, outputting a motion value equal to the lowest absolute difference between any of said pixels and its closest adjacent pixel in the field of opposite parity*; and*

*converting the video signal from interlaced to progressive format using the motion value.*

2. The method of claim 1 wherein said pixels are measured from the same vertical positions in fields of like parity, irrespective of the order in which the fields were received.

3. The method of claim 1 wherein two vertically adjacent pixels are taken from an even video field and two vertically adjacent pixels are taken from an odd video field.

4. The method of claim 1 wherein motion values produced from each of a plurality of sets of vertically adjacent pixels are summed substantially over an entire field to produce an overall measure of the motion between said fields of opposite parity.

5. Apparatus for measuring motion at a horizontal and vertical position between video fields of opposite parity comprising:

register means for selecting at least two vertically adjacent pixels from a video field of one parity and at least two vertically adjacent pixels from a video field of the opposite parity such that when taken together, the pixels represent contiguous samples of an image at said horizontal and vertical position; and differencing circuitry for determining whether the signal value of any of said pixels lies between the signal values of adjacent pixels in the field of opposite parity and in response outputting a zero motion value, otherwise, outputting a motion value equal to the lowest absolute difference between any of said pixels and its closest adjacent pixel in the field of opposite parity.

*6. The apparatus of claim 5 wherein said pixels are measured from the same vertical positions in fields of like parity, irrespective of the order in which the fields were received.*

*7. The apparatus of claim 5 wherein two vertically adjacent pixels are taken from an even video field and two vertically adjacent pixels are taken from an odd video field.*

*8. The apparatus of claim 5 wherein motion values produced from each of a plurality of sets of vertically adjacent pixels are summed substantially over an entire field to produce an overall measure of the motion between said fields of opposite parity.*

*9. Apparatus for measuring motion at a horizontal and vertical position between video fields of opposite parity comprising:*

*means for measuring the signal values of at least two vertically adjacent pixels from a video field of one parity and at least two vertically adjacent pixels from a video field of the opposite parity such that when taken together, the pixels represent contiguous samples of an image at said horizontal and vertical position; and*

*differencing circuitry for determining whether the signal value of any of said pixels lies between the signal values of adjacent pixels in the field of opposite parity and in response outputting a zero motion value, otherwise, outputting a motion value equal to the lowest absolute difference between any of said pixels and its closest adjacent pixel in the field of opposite parity.*

*10. The apparatus of claim 9 wherein said pixels are measured from the same vertical positions in fields of like parity, irrespective of the order in which the fields were received.*

*11. The apparatus of claim 9 wherein two vertically adjacent pixels are taken from an even video field and two vertically adjacent pixels are taken from an odd video field.*

*12. The apparatus of claim 9 wherein motion values produced from each of a plurality of sets of vertically adjacent pixels are summed substantially over an entire field to produce an overall measure of the motion between said fields of opposite parity.*

* * * * *